Aug. 29, 1961    J. G. JOHNSTON    2,998,006
SOLAR FLUID HEATER

Filed July 1, 1958    3 Sheets-Sheet 1

John G. Johnston
INVENTOR.

BY *Clarence A. O'Brien*
*and Harvey B. Jackson*
Attorneys

Aug. 29, 1961      J. G. JOHNSTON      2,998,006
SOLAR FLUID HEATER
Filed July 1, 1958      3 Sheets-Sheet 2
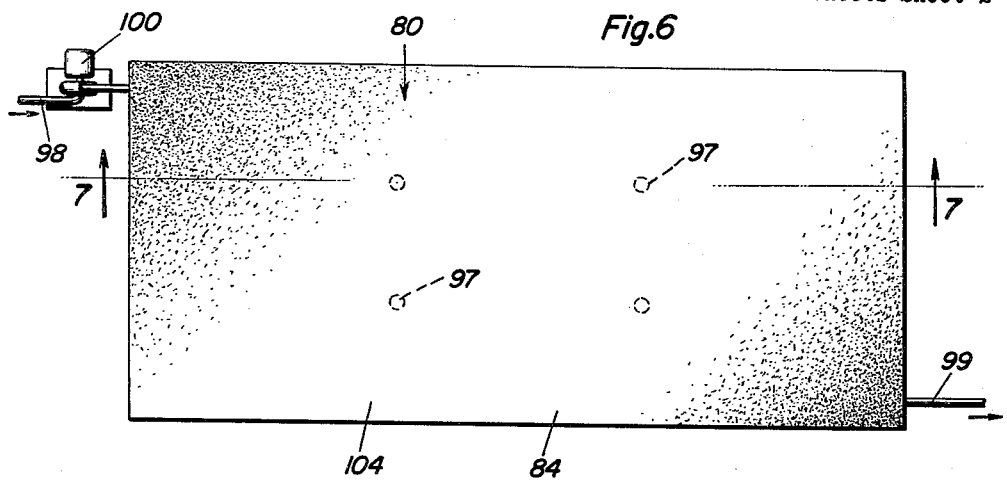
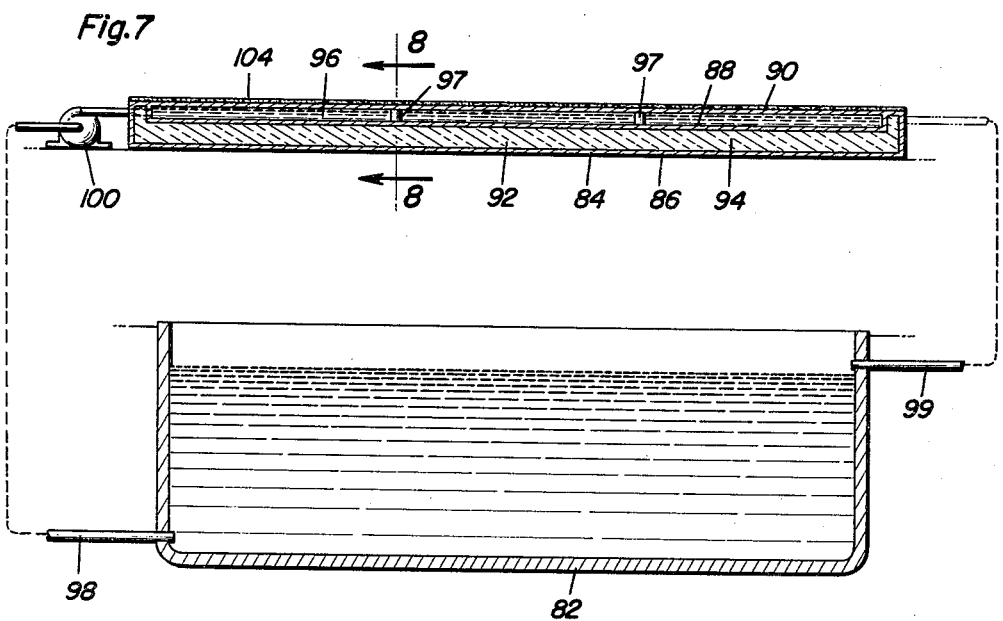
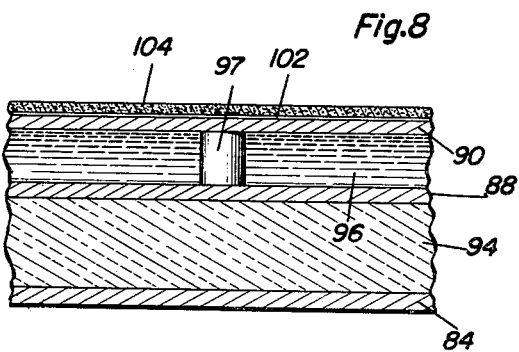
John G. Johnston
INVENTOR.

Aug. 29, 1961  J. G. JOHNSTON  2,998,006
SOLAR FLUID HEATER
Filed July 1, 1958  3 Sheets-Sheet 3
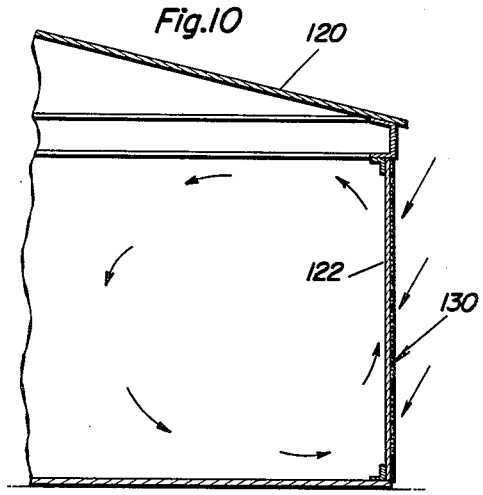
Fig.10
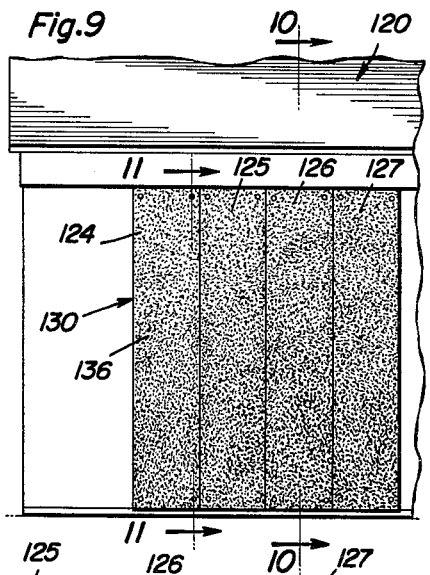
Fig.9
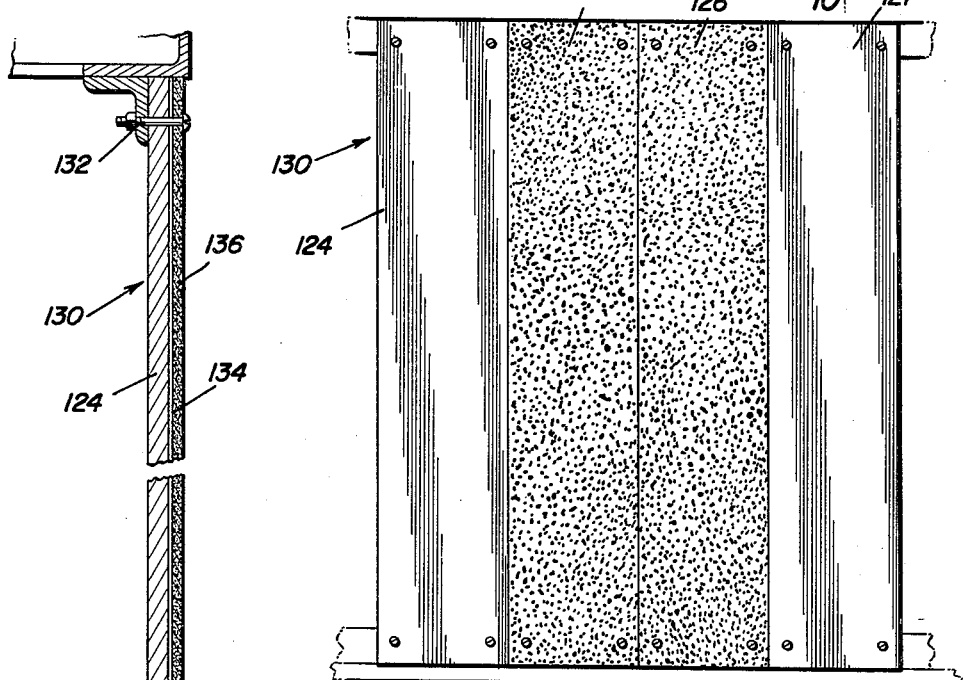
Fig.11
Fig.12
John G. Johnston
INVENTOR.

ered Aug. 29, 1961

2,998,006
SOLAR FLUID HEATER
John G. Johnston, Rte. 3, Box 84A, Palmdale, Calif.
Filed July 1, 1958, Ser. No. 745,925
10 Claims. (Cl. 126—271)

This invention relates to solar heaters and more particularly to solar heaters which are adapted to function with a fluid such as water or air.

Nearly all present solar heaters use a glass face. Those which do not have a light absorbing surface and no means for preventing air currents from sweeping the resulting heat from the surface away from the object to be heated. In the case of the glass face, glass reflects much of the light away from the object to be heated especially at medium and large angles of incidence.

This invention improves the method of heating fluids in compartments separated from the sunlight by an opaque highly thermal conductive wall. The metal fluid container that typifies the invention, has a highly transparent non-reflective substance bonded to its face. A good substance such as is known in the glass fiber trade as "filter media" is an expanded and impregnated glass fiber mat of minimum density, clear, and best for the purpose of the invention in predetermined thickness, for instance from one-quarter to one-half inch for some applications of the principles of this invention. The face will let the sun's rays through to the container that exemplifies the invention and since the container has a black coating, for instance, black paint, there will be no reflection. This will hold the heat generated until a highly conductive metal can conduct the heat to the fluid on the other side that functions as the heat transfer medium in the numerous applications of the invention.

In one form of the invention a swimming pool water heater is constructed. The heater is most efficient when the difference in temperature is as great as possible between the outer surface (exposed to the sun's rays) and the fluid being heated, this being consonant with the laws of physics. In one swimming pool heater the volume of water passing through should be great enough to hold the temperature down to 100–110 degrees F. while the temperature at the face of the heater operates 140° to 200° F. Tests show as much as 300 B.t.u. per square foot of surface output under these conditions.

Another application of the invention is in connection with buildings. Here the fluid being heated to function as a heat transfer medium, is air. The basic principle, though, is the same. The heating fluids in compartments in the building embodiment, are separated from the sunlight by an opaque highly thermal conductive wall.

Buildings are produced in large quantities, having steel girders and covered with aluminum or steel sheeting. The solar heater can be installed in place of a section of a wall of the building. A typical heater consists of a series of aluminum or steel sheets painted black on one side and covered with expanded and impregnated glass fiber to form a mat, while the other side of the sheeting remains reflective. With the black surface and fibrous mat on the outside, the sun penetrates the mat, strikes the black surface so that the light rays surrender heat without dissipation to the outside air. The heat is conducted to the inside fluid, air in this case, and heats the interior of the building. In the summer months when no heat is desired, the aluminum sections can be reversed so that the heater functions as an excellent insulator.

The same basic laws of physics apply here as in the swimming pool heater, that is, by heating a great quantity of air and keeping the temperature difference large between the outside and the inside, the efficiency of the heater is high. The temperature at the face of a typical panel is 140° to 200° F. and can readily surrender its heat to the air at say 70° to 80° through highly thermal conductive sheets. The distribution of heat within the building can be achieved in any way with or without the aid of mechanical forced feeding devices.

Only two specific applications of the invention have been discussed. The invention is considerably more general, though, and can be embodied in many different shapes for different specific uses. It is obvious that the water or air need not be restricted to a swimming pool and building respectively. It is further apparent that the heated water could have its temperature increased to the extent that steam is generated for steam heating or other purposes. Moreover, the actual shape of the heater will, of necessity, be varied so that it will operate more effectively for a particular job.

Accordingly, an object of this invention is to provide improvements in solar heaters which use a fluid as the medium to be heated.

A further object of the invention is to provide a solar heater which is more efficient than previous solar heaters due to the particular arrangement of parts in the heater.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a plan view of a modification of the invention.

FIGURE 7 is a sectional view taken on the line 7—7 of FIGURE 6.

FIGURE 8 is a sectional view taken upon an enlarged scale and taken on the line 8—8 of FIGURE 7.

FIGURE 9 is a fragmentary elevational view schematically representing another embodiment of the invention.

FIGURE 10 is a sectional view taken on the line 10—10 of FIGURE 9.

FIGURE 11 is an enlarged sectional view taken on the line 11—11 of FIGURE 9.

FIGURE 12 is an elevational view showing the adjustment of two panels for heat regulation.

Figure 1:
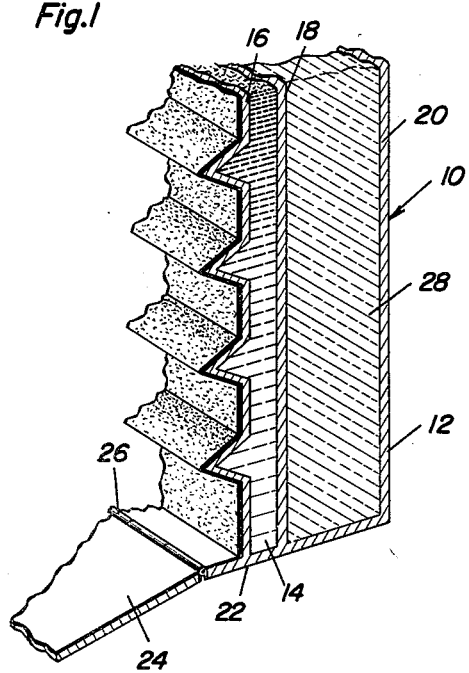
FIGURE 1 is a fragmentary perspective view of a typical solar heater constructed in accordance with the invention.
Figure 2:
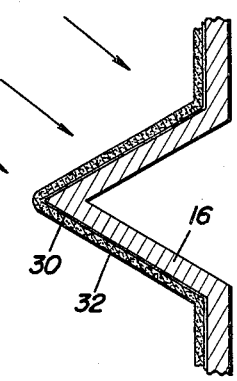
FIGURE 2 is an enlarged fragmentary sectional view of a part of the heater in FIGURE 1.

In the accompanying drawings, one embodiment of the solar heater is shown in FIGURES 1 and 2. Heater 10 is constructed of a metal container 12 with a fluid compartment 14 therein. The fluid in this instance, is water. Container 12 has a front wall 16 made of corrugated metal, for instance aluminum or steel, an intermediate wall 18 and a rear wall 20. Compartment 14 is between walls 16 and 18 with the top and end walls thereof unshown. Bottom wall 22, for structural convenience, extends forwardly a short distance to have reflective panel 24 easily connected therewith, for instance by hinge 26 so that the angle of the reflective panel can be adjusted. The space between walls 18 and 20 has insulation 28 therein.

The front wall 16 has a coating of heat absorbing substance thereon, for instance coating 30 of black paint. A fibrous mat 32 is on the outside of coating 30 and can be adhered thereto by applying the mat directly onto the paint. The insulating mat 32 is made of a highly transparent, non-reflective substance such as an expanded and impregnated glass fiber of minimum density. This will permit the sun's rays to pass therethrough in order to reach the black coating or film 30 at which the heat from the sun's rays is surrendered to the metal wall 16 without reflection. Mat 32 will hold the heat there until the highly conductive metal wall 16 can have the heat conducted therefrom by the fluid in compartment 14. Insulation 28 also helps to hold the heat in compartment 14 whereby the fluid in the compartment can be drawn therefrom or can be continuously circulating therethrough and used for any purpose.

Figure 3:
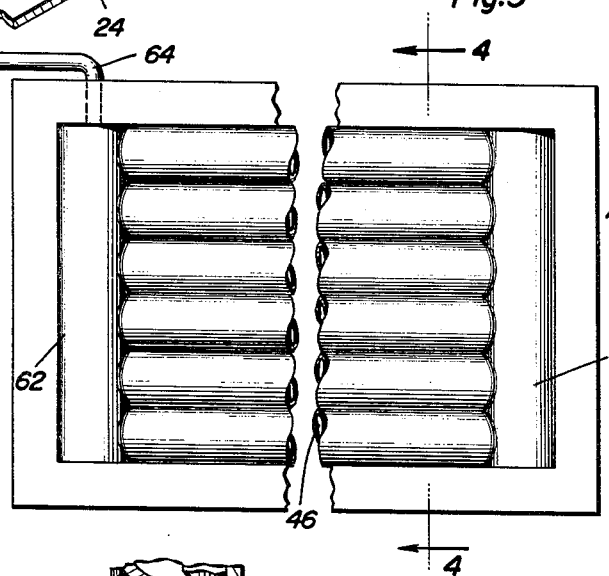
FIGURE 3 is an elevational view of a modification of the heater.
Figure 4:
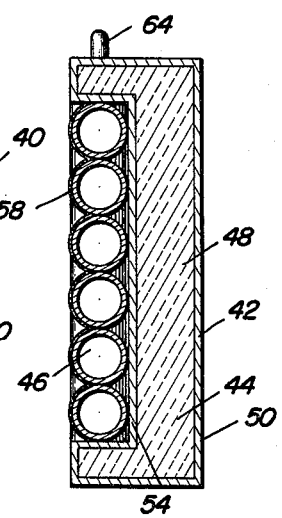
FIGURE 4 is a sectional view taken on the line 4—4 of FIGURE 3.
Figure 5:
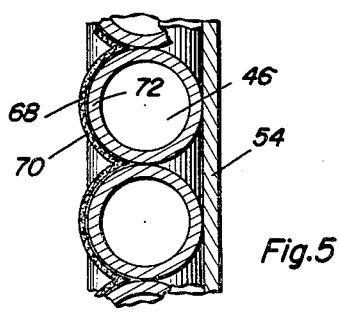
FIGURE 5 is an enlarged fragmentary sectional detail showing the arrangement of laminations that provide for highly efficient heat surrender from the sun's rays and highly efficient recovery of that heat in a fluid medium.

The embodiment of FIGURES 3-5 functions very much the same. Heater 40 has a container 42 with two compartments 44 and 46 therein. The compartment 44 has insulation 48 which, like insulation 28, can be fibrous low-density substance. The compartment 48 is made of side walls, a rear wall 50 and a wall 54 parallel to wall 50. Compartment 46 is adapted to contain a fluid medium to which the sun's rays surrender heat. The compartment 46 is made of a group of tubes 58 connected with headers 60 and 62 at their ends. One or more of the headers can have a circulatory system connected therewith and represented by pipe 64 to which a circulating pump is connectible.

The outside face of each tube has a coating or film 68 of heat absorbing substance, for instance black paint, and there is a fibrous mat 70 adhered thereto, with mats 70 being identical in construction to mat 32. It also functions the same way. The operation of this form of the invention is identical to the operation of the form described in FIGURE 1, insofar as heat recovery from the sun's rays are concerned. The light penetrates mat 70 very effectively, strikes the metal surface and surrenders heat to the highly heat conductive front wall 72 of each tube. The fluid flowing in compartment 46 conducts the heat away for use elsewhere, while insulation 48 aids in keeping the heat in the compartment 46 and hence, the fluid that is passing through this compartment. This form of the invention is particularly useful in connection with steam generation, although it can be used as a heater for water.

Reference is now made to FIGURES 6-8. In this form of the invention heater 80 is part of a swimming pool 82 heating system. The heater is made of a container 84 having a rear wall 86, an intermediate wall 88 and an outer wall 90 adapted to face the sun's rays. There are side walls enclosing compartment 92 within which insulation 94 is disposed to insulate one side of compartment 96 formed between walls 88 and 90. The compartment 96 is preferably formed with a corrugated face and therefore wall 90 can be made of corrugated aluminum or metal or some other highly heat conductive substance. Spacers 97 are attached to walls 90 and 88, extending across the width of the compartment 96. The swimming pool 82 has water circulated therethrough all of the time that additional heat for the pool water is desired. Therefore, pipe lines 98 and 99 are shown connected to the pool and to an inlet and outlet of compartment 96. Circulating pump 100 is in one of the pipe lines and can be controlled in the usual way.

The outside surface of wall 90 has a coating or film 102 of highly heat absorbent substance, for instance, black paint, thereon. Mat 104 is fibrous insulating material, the same as mats 32 and 70, is adhered thereto. In operation, the sun rays pass through the insulating mat 104 and surrender their heat when striking the black coating 102. The presence of the insulation mat 104, 32 and 70 prevent the wind from blowing across the coatings and carrying off heat. At the same time, wall 90, being made of a highly heat conductive substance, surrenders the heat to the flowing fluid in compartment 96 so that the fluid can be conducted through the pipe lines to the swimming pool 82.

In FIGURES 10-12 a further embodiment of the invention is shown. A building 120 schematically represents any type of building. One part 122 of a wall of the building has a plurality of panels or sections, such as sections or panels 124, 125, 126 and 127 respectively. Although shown only as a portion of one wall, heater 130 made of the four panels of FIGURE 12, can be enlarged, reduced in size and can be made any part or parts of the building such as the roof or the ends of the sides of the building. Moreover, the parts of the building selected for heater 130 and others like it should be most favorably selected for directional orientation.

Heater 130 has each of its panels made the same. Typical panel 124 is fastened at the top and the bottom by removable fasteners 132, for instance, bolts that attach to a part of the structural framing of building 120. The panels are flat and made of highly conductive substance, such as aluminum or steel sheeting. There is a film or coating 134 of black paint on the face of panel 124, and mat 136 of fibrous insulating material adhered to coating 134. The operation of this form of the invention entails the surrender of heat to fluid within the building. In this instance the fluid heated is air which can circulate by convection movement within the building as shown by the arrows in FIGURE 10.

In the winter time the panels can be reversed so that they function as insulators for the building instead of heaters.

In the embodiment of the invention in FIGURE 10, the bolting of the panels in place merely schematically represents one method of achieving adjustment of the panels. They can be attached by vertical spindles or spindles in any other orientation, and have a mechanism capable of rotating them through a 360° movement so that it is not necessary to separate the panels from the building in order to change their orientation.

Although several embodiments of the invention are shown and described, the basic principle of operation is the same. Moreover, some of the materials of construction can be varied. In addition to the options mentioned herein, others will become readily apparent to those skilled in the art. For instance, the film or coating of black paint need not be actually paint at all. It may be a thin plastic film, of black material, and the same holds true for the other materials of construction, there being numerous substitutes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A solar heater comprising a container having a compartment, said container compartment adapted to contain fluid that functions as a heat absorbing medium, said compartment having walls, one of said walls constituting the outer face of the heater and being made of highly heat conductive substance, a film of heat absorbing material on the outer surface of said outer wall, and a loosely bound fibrous mat of very low density attached to said film to provide a transparent, non-reflective covering which prevents wind from sweeping across said film when the light rays penetrate said mat and surrender heat upon striking said film.

2. The solar heater of claim 1 wherein said film is black paint, said compartment outer wall is highly reflective metal, and the fluid in said compartment is water.

3. In a solar heater, a highly heat conductive wall, a film of heat absorbing material on the one face thereof, a loosely bound fibrous mat of very low density attached to said film to provide a transparent, non-reflective covering through which light rays can pass in order to strike said film and surrender heat to said wall.

4. The combination of claim 3 wherein there is a container, a compartment in said container with said wall constituting a wall of said compartment, a second wall spaced from the first mentioned wall and constituting another wall of said compartment, and said compartment adapted to receive fluid which is circulated therethrough to absorb heat from the first mentioned wall and thereby heat the fluid.

5. The combination of claim 4 wherein said compartment wall is corrugated.

6. The combination of claim 4 wherein said fluid is water.

7. In a solar heater for heat exchange between a fluid and the sun rays, the improvement comprising means for recovering heat from the sun's rays as heat in the fluid and including a wall, a film of heat absorbing material on one surface of said wall, a loosely bound fibrous mat of very low density attached to said film to provide a transparent, non-reflective covering through which the sun's rays can pass to strike said film and surrender heat thereto, said wall constructed of highly heat conductive substance to receive the heat liberated by said film, and said wall having an inner surface in heat exchange relationship to the fluid that is to be heated.

8. The combination of claim 7 wherein said fluid is water.

9. In a solar heater for heat exchange between a fluid and the sun rays, the improvement comprising means for recovering heat from the sun's rays as heat in the fluid and including a wall, a film of heat absorbing material on one surface of said wall, a loosely bound fibrous mat of very low density attached to said film to provide a transparent, non-reflective covering through which the sun's rays can pass to strike said film and surrender heat thereto, said wall constructed of highly heat conductive substance to receive the heat liberated by said film, and said wall having an inner surface in heat exchange relationship to the fluid that is to be heated, a container having a second wall, means connected with both of said walls for enclosing a compartment within which to accommodate a fluid, and means for insulating said second wall.

10. The combination of claim 9 wherein there is a reflector adjacent to the first mentioned wall for directing the sun's rays thereto, said first mentioned wall being corrugated to receive reflected light in addition to direct light rays.

References Cited in the file of this patent

UNITED STATES PATENTS

| | | |
|---|---|---|
| 2,462,952 | Dunkak | Mar. 1, 1949 |
| 2,553,302 | Cornwall | May 15, 1951 |

OTHER REFERENCES

Ser. No. 253,935, Sonigliana (A.P.C.), published May 4, 1943.

Steelcote Publication, copy-right 1926, Steelcote Manufacturing Co., St. Louis, Mo.